(12) United States Patent
Wu

(10) Patent No.: US 10,728,465 B2
(45) Date of Patent: Jul. 28, 2020

(54) METHOD AND DEVICE FOR COMPOSITING A PLURALITY OF IMAGES

(71) Applicant: GUANGDONG OPPO MOBILE TELECOMMUNICATIONS CORP., LTD., Dongguan, Guangdong (CN)

(72) Inventor: Lei Wu, Guangdong (CN)

(73) Assignee: GUANGDONG OPPO MOBILE TELECOMMUICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/311,722

(22) PCT Filed: Apr. 1, 2017

(86) PCT No.: PCT/CN2017/079381
§ 371 (c)(1),
(2) Date: Dec. 20, 2018

(87) PCT Pub. No.: WO2018/018927
PCT Pub. Date: Feb. 1, 2018

(65) Prior Publication Data
US 2019/0208103 A1 Jul. 4, 2019

(30) Foreign Application Priority Data

Jul. 29, 2016 (CN) .......................... 2016 1 0616329

(51) Int. Cl.
*H04N 5/235* (2006.01)
*H04N 5/232* (2006.01)
(Continued)

(52) U.S. Cl.
CPC ......... *H04N 5/2353* (2013.01); *G06T 3/4038* (2013.01); *G06T 5/50* (2013.01);
(Continued)

(58) Field of Classification Search
None
See application file for complete search history.

(56) References Cited

U.S. PATENT DOCUMENTS 8,305,453 B2  11/2012  Terauchi
8,471,915 B2 *  6/2013  Robinson ................. G06T 3/00
                                                  348/208.1
(Continued)

FOREIGN PATENT DOCUMENTS

CN    1717702    1/2006
CN    101035206  9/2007
(Continued)

OTHER PUBLICATIONS

EPO, Office Action for EP Application No. 17833233.4, Jun. 28, 2019.
(Continued)

*Primary Examiner* — James M Hannett
(74) *Attorney, Agent, or Firm* — Hodgson Russ LLP

(57) ABSTRACT

The present disclosure provides a method and a device for compositing a plurality of images. The method includes obtaining a first exposure time t required for current photographing. The first exposure time t is divided into N segments where N is M power of 4, and M is a positive integer. A micro-electro-mechanical system (MEMS) controls an image sensor to move clockwise or anticlockwise according to a step length of a preset number of pixels. The image sensor is controlled to expose for a second exposure time t/N after each movement of the image sensor according to the preset number of pixels, to obtain N images. The N images are composited to obtain a composite picture.

17 Claims, 3 Drawing Sheets

(51) Int. Cl.
*G06T 3/40* (2006.01)
*G06T 5/50* (2006.01)
*H04N 5/349* (2011.01)

(52) U.S. Cl.
CPC ....... *H04N 5/2356* (2013.01); *H04N 5/23232* (2013.01); *H04N 5/23238* (2013.01); *H04N 5/23277* (2013.01); *H04N 5/23287* (2013.01); *H04N 5/349* (2013.01); *G06T 2207/20216* (2013.01); *G06T 2207/20221* (2013.01)

(56) References Cited

U.S. PATENT DOCUMENTS

| | | | |
|---|---|---|---|
| 9,049,396 B2 * | 6/2015 | Silverstein | G06T 3/005 |
| 2014/0307110 A1 | 10/2014 | Liu | |
| 2016/0098852 A1 | 4/2016 | Senda et al. | |
| 2016/0212332 A1 * | 7/2016 | Tang | H04N 5/23232 |
| 2017/0024856 A1 * | 1/2017 | Kajimura | G06T 3/40 |

FOREIGN PATENT DOCUMENTS

| | | |
|---|---|---|
| CN | 101102417 | 1/2008 |
| CN | 103634513 | 3/2014 |
| CN | 104769934 | 7/2015 |
| CN | 105472357 | 4/2016 |
| CN | 105611181 | 5/2016 |
| CN | 106254772 | 12/2016 |
| JP | H06225317 | 8/1994 |
| WO | 2018018927 | 2/2018 |

OTHER PUBLICATIONS

WIPO, ISR for PCT/CN2017/079381, dated May 27, 2017.
SIPO, First Office Action for CN Application No. 201610616329, dated May 17, 2017.
USPTO, Office Action for U.S. Appl. No. 16/436,664, dated Dec. 16, 2019.

* cited by examiner

METHOD AND DEVICE FOR COMPOSITING A PLURALITY OF IMAGES

CROSS REFERENCE TO RELATED APPLICATION

This application is a U.S. national phase application of International Application No. PCT/CN2017/079381, filed on Apr. 1, 2017, which is based upon and claims priority to Chinese Patent Application No. 201610616329.X, filed on Jul. 29, 2016, the entire contents of which are incorporated herein by reference.

TECHNICAL FIELD

The present disclosure relates to the field of mobile terminal technologies, and more particular to a method and a device for compositing a plurality of images.

BACKGROUND

With popularity of mobile photographing devices, there are various photographing technologies in related arts. Multi-image photographing and composition technology is a more complex photographing technology than a single-image photographing technology. The multi-image photographing and composition technology is applied to panoramic photographing, HDR composition, long exposure electron aperture and the like.

SUMMARY

Embodiments of the present disclosure provide a method for compositing a plurality of images, a device for compositing a plurality of images and a mobile terminal.

The method for compositing a plurality of images according to embodiments of the present disclosure includes acquiring a first exposure time t required for current photographing, and dividing the first exposure time t into N segments, where N is M power of 4 and M is a positive integer; controlling by a micro-electro-mechanical system MEMS, an image sensor to move clockwise or counterclockwise according to a step length of a preset number of pixels, and controlling the image sensor to expose for a second exposure time t/N after each movement of the image sensor according to the preset number of pixels, to acquire N images; and compositing the N images to obtain a composite picture.

The device for compositing a plurality of images according to embodiments of the present disclosure includes: a processor, and a memory having instructions executable by the processor stored thereon, in which the processor is configured to perform the method for compositing a plurality of images described above.

The mobile terminal according to embodiments of the present disclosure includes a housing, a processor, a memory, a circuit board and a power circuity, in which the circuit board is arranged in a space enclosed by the housing; the processor and the memory are arranged on the circuit board; the power circuity is configured to provide power to various circuities and components of the mobile terminal; the memory is configured to store executable program codes; the processor is configured to run programs corresponding to the executable computer codes by reading the executable program codes stored in the memory, to perform the method for compositing a plurality of images described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
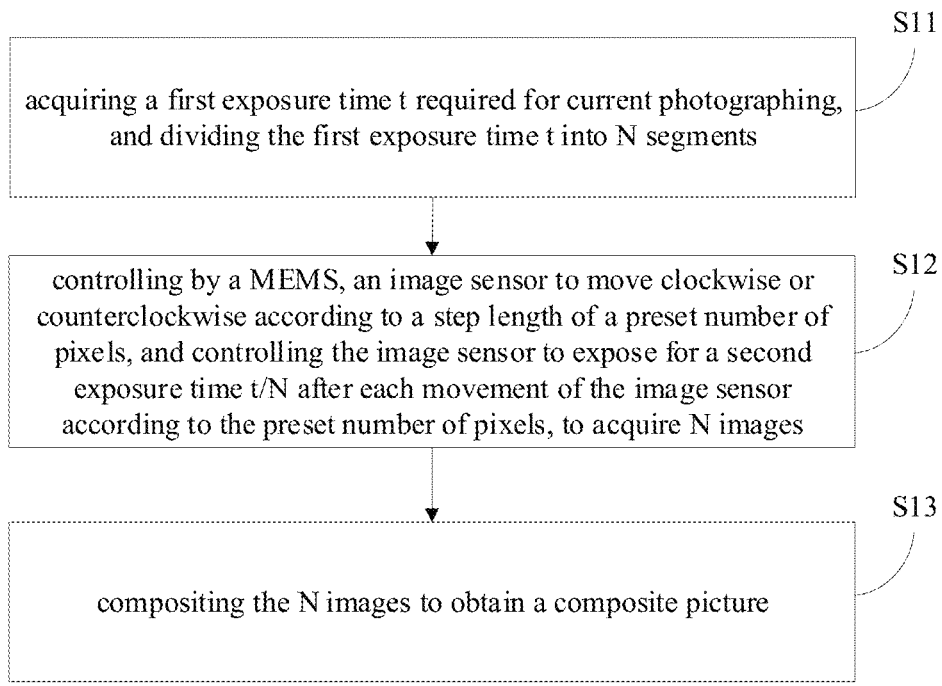
FIG. 1 is a flow chart illustrating a method for compositing a plurality of images according to an embodiment of the present disclosure.

Descriptions will be made in detail to embodiments of the present disclosure and examples of the embodiments are illustrated in drawings. The same or similar elements and the elements having same or similar functions are denoted by like reference numerals throughout the descriptions. The embodiments described herein with reference to drawings are explanatory, are used to understand the present disclosure, and are not be construed to limit the present disclosure.

With development of mobile terminals, hardware of the mobile terminal is constantly updated. For example, a micro-electro-mechanical system (MEMS) is used in the mobile terminal. Specifically, the MEMS may be applied to several components, for example, applied to an imaging component. The imaging component includes a lens, a MEMS, an image senor and the like. The MEMS may drive the image sensor to move along different directions within a same plane.

A multi-image photographing and composition technology is applied to panoramic photographing, HDR composition, long exposure electronic aperture and the like. A difficulty in the above photographing technologies is how to perform image composition.

Generally, a mobile terminal may be shaken when the mobile terminal is hold by hands and used for photographing, thereby causing pixel misalignment when the image composition is performed. In related arts, in order to improve quality of a composite image, a fixture device, such as a tripod, may be used to fix the mobile terminal. However, carrying the fixture device may influence photographing convenience and photographing experience.

Therefore, how to reduce the pixel misalignment when the multi-image photographing and composition is performed by the mobile terminal becomes a technical problem to be solved.

Embodiments of the present disclosure provide a method for compositing a plurality of images, a device for compositing a plurality of images, a mobile terminal and a non-transitory computer storage medium.

The method for compositing a plurality of images includes acquiring a first exposure time t required for current photographing, and dividing the first exposure time t into N segments, where N is M power of 4 and M is a positive integer; controlling by a micro-electro-mechanical system MEMS, an image sensor to move clockwise or counterclockwise according to a step length of a preset number of pixels, and controlling the image sensor to expose for a second exposure time t/N after each movement of the image sensor according to the preset number of pixels, to acquire N images; and compositing the N images to obtain a composite picture.

The device for compositing a plurality of images includes an acquisition module, configured to acquire a first exposure time t required for current photographing, and divide the first exposure time t into N segments, where N is M power of 4 and M is a positive integer; a processing module, configured to control via a micro-electro-mechanical system MEMS, an image sensor to move clockwise or counterclockwise according to a step length of a preset number of pixels, and control the image sensor to expose for a second exposure time t/N after each movement of the image sensor according to the preset number of pixels, to acquire N images; and a composition module, configured to composite the N images to obtain a composite picture.

The mobile terminal includes a housing, a processor, a memory, a circuit board and a power circuity, wherein the circuit board is arranged in a space enclosed by the housing; the processor and the memory are arranged on the circuit board; the power circuity is configured to provide power to various circuities and components of the mobile terminal; the memory is configured to store executable program codes; the processor is configured to run programs corresponding to the executable computer codes by reading the executable program codes stored in the memory, to perform the method for compositing a plurality of images described above.

The non-transitory computer storage medium has one or more programs stored thereon. When the one or more programs are executed by a device, the device is configured to execute the method for compositing a plurality of images described above.

FIG. 1 is a flow chart illustrating a method for compositing a plurality of images according to an embodiment of the present disclosure. It should be explained that, the method for compositing a plurality of images may be applicable to a mobile terminal including the imaging component. The mobile terminal may be for example a hardware device having various operation systems, such as a phone, a tablet computer or the like.

As illustrated in FIG. 1, the method for compositing a plurality of images may include the followings.

In block S11, a first exposure time t required for current photographing is acquired, and the first exposure time t is divided into N segments.

N is M power of 4, where M is a positive integer.

It should be explained that, N is a value set in advance according to pixel requirements. For example, the number of pixels of a camera included in a smart phone is 4 million. When it is required to provide an image having 16 million pixels, N is 4 and M is correspondingly 1.

It should be explained that, N may be set according to requirements of a specific application scenario. For example, N may be 16.

In block S12, an image sensor is controlled by the MEMS to move clockwise or counterclockwise according to a step length of a preset number of pixels, and the image sensor is controlled to expose for a second exposure time t/N after each movement of the image sensor according to a preset number of pixels, to acquire N images.

It should be understood that, the MEMS is moveable. For example, the MEMS is connected to a driving circuity and moves under driven of a driving voltage outputted by the driving circuity.

The preset number of pixels is set in advance. For example, the preset number of pixels may include one pixel. That is to say, the MEMS controls the image sensor to move clockwise or counterclockwise by taking the one pixel as the step length.

It should be explained that, the number of movements of the image sensor controlled by the MEMS is related to N.

Figure 2:
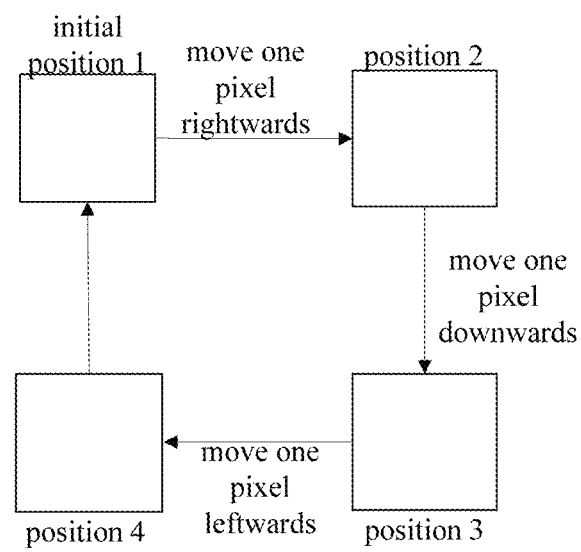
FIG. 2 is a schematic diagram illustrating that micro-electro-mechanical system (MEMS) controls an image sensor to move.

The one pixel is taken as an example to illustrate that the MEMS controls the image sensor to move in combination with FIG. 2. Assuming that N is 4, i.e., the first exposure time t is divided into 4, and the second exposure time is correspondingly t/4. When the image sensor is located at an initial position 1, the MEMS controls the images sensor to expose for the second exposure time t/4 for once, to acquire a first image. The MEMS controls the image sensor to move one pixel rightwards, such that the image sensor is located at a position 2. The image sensor is exposed again for the second exposure time t/4 for once, to acquire a second image. Afterwards, the MEMS controls the image sensor to move one pixel from the position 2 downwards, such that the image sensor is located at a position 3. The image sensor is exposed again for the second exposure time t/4 for once, to acquire a third image. The MEMS controls the image sensor to move one pixel from the position 3 leftwards, such that the image sensor is located at a position 4. The image sensor is exposed again for the second exposure time t/4 for once, to acquire a fourth image. In addition, it should be understood that, when the MEMS controls the image sensor to move one pixel from the position 4 upwards, the image sensor is located at the initial position 1 again.

In block S13, the N images are composited to obtain a composite picture.

After the N images are acquired, the plurality of images are composited using a principle of multi-image composition, to provide the composite picture having a high quality to the user, thereby satisfying a quality requirement to the picture of the user.

With the method for compositing a plurality of images according to embodiments of the present disclosure, when it is required to composite a plurality of captured images, the first exposure time t required for current photographing is acquired, and the first exposure time t is divided into N segments. The MEMS controls the image sensor to move clockwise or counterclockwise according to the step length of the preset number of pixels, and controls the image sensor to expose for the second exposure time t/N after each movement of the image sensor according to the preset number of pixels, to acquire N images. The N images are composited to obtain the composite picture. Therefore, by controlling the movement of the image sensor via the MEMS, the shakiness during the photographing is reduced, thereby further improving the quality of each image captured and improving an imaging quality of the composite picture.

Figure 3:
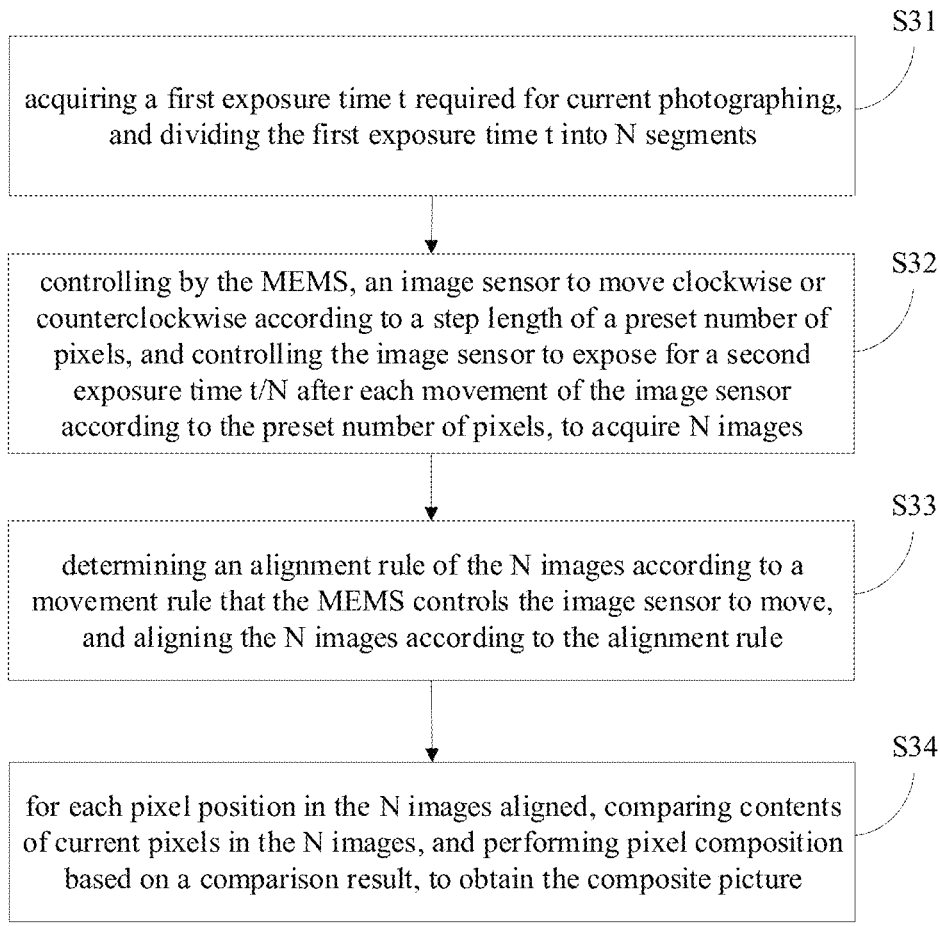
FIG. 3 is a flow chart illustrating a method for compositing a plurality of images according to another embodiment of the present disclosure.

FIG. 3 is a flow chart illustrating a method for compositing a plurality of images according to another embodiment of the present disclosure. It should be explained that, the method for compositing a plurality of images may be applied to a mobile terminal having an imaging component. The mobile terminal may be a hardware device having various operation systems, such as a phone, a tablet computer or the like.

As illustrated in FIG. 3, the method for compositing a plurality of images includes the followings.

In block S31, a first exposure time t required for current photographing is acquired and the first exposure time t is divided into N segments.

N is M power of 4, where M is a positive integer.

It should be explained that, N is a value set in advance according to pixel requirements. For example, the number of pixels of a camera included in a smart phone is 4 million. When it is required to provide an image having 16 million pixels, N is 4 and M is 1 correspondingly.

It should be explained that, N may be set according to requirements of a specific application scenario. For example, N may be 16.

In block S32, the MEMS controls the image sensor to move clockwise or counterclockwise according to a step length of a preset number of pixels, and controls the image sensor to expose for a second exposure time t/N after each movement of the image sensor based on the preset number of pixels, to acquire N images.

It should be explained that, the MEMS is moveable. For example, the MEMS is connected to a driving circuity and moves under driven of a driving voltage outputted by the driving circuity.

The preset number of pixels is set in advance. For example, the preset number of pixels may include one pixel. That is to say, the MEMS controls the image sensor to move clockwise or counterclockwise by taking the one pixel as the step length.

It should be explained that, the number of movements of image sensor controlled by the MEMS is related to N.

The movement of the image sensor controlled by the MEMS is described in combination with FIG. 2. Assuming that N is 4, i.e., the first exposure time t is divided into 4 segments, and the second exposure time is correspondingly t/4. When the image sensor is located at an initial position 1, the MEMS controls the images sensor to expose for the second exposure time t/4 for once, to acquire a first image. The MEMS controls the image sensor to move one pixel rightwards, such that the image sensor is located at a position 2. The image sensor is exposed again for the second exposure time t/4 for once, to acquire a second image. Afterwards, the MEMS controls the image sensor to move one pixel from the position 2 downwards, such that the image sensor is located at a position 3. The image sensor is exposed again for the second exposure time t/4 for once, to acquire a third image. The MEMS controls the image sensor to move one pixel from the position 3 leftwards, such that the image sensor is located at a position 4. The image sensor is exposed again for the second exposure time t/4 for once, to acquire a fourth image. In addition, it should be understood that, when the MEMS controls the image sensor to move one pixel from the position 4 upwards, the image sensor is located at the initial position 1 again.

In block S33, an alignment rule of the N images is determined according to a movement rule that the MEMS controls the image sensor to move, and the N images are aligned according to the alignment rule.

Specifically, after the N images are acquired, the alignment rule of the N images may be determined according to the movement rule that the MEMS controls the image sensor to move.

For example, in a case that N is 4, after the MEMS controls the image sensor to move according to the movement rule illustrated in FIG. 2 to acquire four images, when the first image, the second image, the third image and the fourth image are composited. For the first image and the second image, the first image moves one pixel leftwards such that the first image and the second image may be aligned to each other. For the first image and the third image, the third image moves one pixel upwards and moves one pixel leftwards, such that the first image and the third image may be aligned to each other. For the first image and the fourth image, the fourth image moves one pixel upwards, such that the first image and the fourth image may be aligned to each other.

In block S34, for each pixel position in the N images aligned, contents of the current pixels in the N images are compared, and pixel composition is performed based on a comparison result to generate the composition picture.

Specifically, for each pixel position in the N images aligned, it is determined whether each of matching degrees between the contents of N current pixels exceeds a preset threshold. When each of the matching degrees exceeds the preset threshold, the N current pixels are superimposed.

That is to say, for the current pixel positions in the four images, the contents of the N current pixels are compared to each other. The N current pixels are superimposed directly when determining that differences between contents of the N current pixels are not significant, such that the N current pixels are composited into a single pixel.

In an embodiment of the present disclosure, when it is determined that any of the matching degrees between the contents of the N current pixels does not exceed the preset threshold, a first current pixel having a maximum difference from other current pixels is determined from the N current pixels. The first current pixel is replaced with one of the other current pixels, and the other current pixels and the replaced first current pixel are superimposed. Therefore, an influence on the imaging quality of the pixel after the image composition caused by the pixel having content with the greatest difference at the same position may be removed.

That is to say, for the N current pixels, when there is a pixel having a greatest difference from the other pixels, the pixel is replaced with one of other pixels, such that the other pixels and the replaced pixel are superimposed.

It should be explained that, a composition process for each pixel in the N images is similar to the composition process for the current pixels, which is not elaborated herein.

It can be seen from the above, during the composition process of the N images in embodiments, the alignment rule of the N images is determined according to the movement rule of the image sensor controlled by the MEMS. The N images are aligned according to the alignment rule, and the pixel composition is performed on the aligned N images, to generate the composite picture. Compared to a method that an alignment mode is determined by a calculation manner, a computation amount of the composition process of the N images is significantly reduced and the time required for compositing the N images is reduced, thereby improving efficiency of compositing the N images.

With the method for compositing a plurality of images according to embodiments of the present disclosure, when it is required to composite a plurality of captured images, the first exposure time t required for current photographing is acquired, and the first exposure time t is divided into N segments. The MEMS controls the image sensor to move clockwise or counterclockwise according to the step length of the preset number of pixels, and controls the image sensor to expose for the second exposure time t/N after each movement of the image sensor according to the preset number of pixels, to acquire N images. The alignment rule of the N images is determined according to movement rule of the image sensor controlled by the MEMS. The N images are aligned according to the alignment rule. For each pixel position in the aligned N images, the contents of the current pixels in the N images are compared to each other. The pixels are composited according to a comparison result, to acquire the composite picture. Therefore, by controlling the movement of the image sensor via the MEMS, shakiness during the photographing is reduced. In addition, when the N images are composited, the alignment rule of the N images may be determined rapidly according to the movement rule of the image sensor controlled by the MEMS, time required for compositing the N images is reduced, thereby improving efficiency of compositing the N images and improving an imaging quality of the composite picture.

In order to implement the above embodiments, the present disclosure further provides a device for composite a plurality of images according to an embodiment of the present disclosure.

Figure 4:
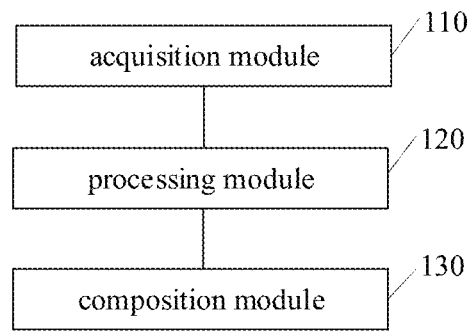
FIG. 4 is a block diagram illustrating a device for compositing a plurality of images according to an embodiment of the present disclosure.

FIG. 4 is a block diagram illustrating a device for compositing a plurality of images according to an embodiment of the present disclosure.

As illustrated in FIG. 4, a device for compositing a plurality of images according to embodiments of the present disclosure may include an acquisition module 110, a processing module 120 and a composition module 130.

The acquisition module 110 is configured to acquire a first exposure time t required for current photographing and divide the first exposure time t into N segments.

N is M power of 4, where M is a positive integer.

The processing module 120 is configured to control an image sensor to move clockwise or counterclockwise according to a step length of a preset number of pixels via an MEMS, and control the image sensor to expose for the second exposure time t/N after each movement of the image sensor according to the preset number of pixels, to acquire N images.

The preset number of pixels is set in advance according to requirements of a scenario. For example, the preset number of pixels may include one pixel.

The composition module 130 is configured to composite the N images to acquire a composite picture.

It should be explained that, explanations and descriptions made to embodiments of the method for compositing a plurality of images may be applicable to the device for compositing a plurality of images according to embodiments, and implementation principles thereof are similar, which are not elaborated herein.

With the device for compositing a plurality of images according to embodiments of the present disclosure, when it is required to composite a plurality of captured images, the first exposure time t required for current photographing is acquired, and the first exposure time t is divided into N segments. The MEMS controls the image sensor to move clockwise or counterclockwise according to the step length of the preset number of pixels, and controls the image sensor to expose for the second exposure time t/N after each movement of the image sensor according to the preset number of pixels, to acquire N images. The N images are composited to obtain the composite picture. Therefore, by controlling the movement of the image sensor via the MEMS, the shakiness during the photographing is reduced, thereby further improving the quality of each image captured and improving an imaging quality of the composite picture.

Figure 5:
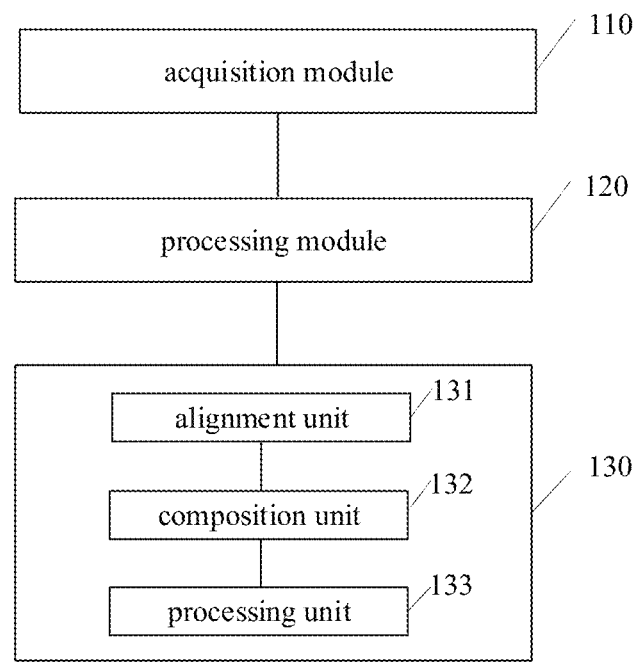
FIG. 5 is a block diagram illustrating a device for compositing a plurality of images according to another embodiment of the present disclosure.

In an embodiment of the present disclosure, on the basis of the embodiment illustrated in FIG. 4, as illustrated in FIG. 5, the composition module 130 may include an alignment unit 131 and a composition unit 132.

The alignment unit 131 is configured to determine an alignment rule of the N images according to a movement rule of the image sensor controlled by the MEMS, and to align the N images according to the alignment rule.

The composition unit 132 is configured to, for each pixel position in the N images aligned, compare contents of current pixels in the N images, and to perform pixel composition based on a comparison result.

In an embodiment of the present disclosure, the composition unit 132 is specifically configured to determine whether each of matching degrees between the contents of N current pixels exceeds a preset threshold, and to superimpose the N current pixels when each of the matching degrees exceeds the preset threshold.

In an embodiment of the present disclosure, as illustrated in FIG. 5, the above composition module 130 may further include a processing unit 133.

The processing unit 133 is configured to determine a first current pixel having a maximum difference from other current pixels in the N current pixels when determining that any of the matching degrees between the contents of N current pixels does not exceed the preset threshold, and to replace the first current pixel with one of the other current pixels and to superimpose the other current pixels and the replaced first current pixel.

It can be seen from the above, during the composition process of the N images in embodiments, the alignment rule of the N images is determined according to the movement rule of the image sensor controlled by the MEMS. The N images are aligned according to the alignment rule, and the pixel composition is performed on the aligned N images, to generate the composite picture. Compared to a method that an alignment mode is determined by a calculation manner, a computation amount of the composition process of the N images is significantly reduced and the time required for compositing the N images is reduced, thereby improving efficiency of compositing the N images.

In order to implement the above embodiments, the present disclosure further provides a mobile terminal.

The mobile terminal includes the device for compositing a plurality of images according to embodiments of a second aspect of the present disclosure.

With the mobile terminal according to embodiments of the present disclosure, when it is required to composite a plurality of captured images, the first exposure time t required for current photographing is acquired, and the first exposure time t is divided into N segments. The MEMS controls the image sensor to move clockwise or counterclockwise according to the step length of the preset number of pixels, and controls the image sensor to expose for the second exposure time t/N after each movement of the image sensor according to the preset number of pixels, to acquire N images. The N images are composited to obtain the composite picture. Therefore, by controlling the movement of the image sensor via the MEMS, the shakiness during the photographing is reduced, thereby further improving the quality of each image captured and improving an imaging quality of the composite picture.

In order to achieve the above embodiments, the preset disclosure further provides a mobile terminal.

Figure 6:
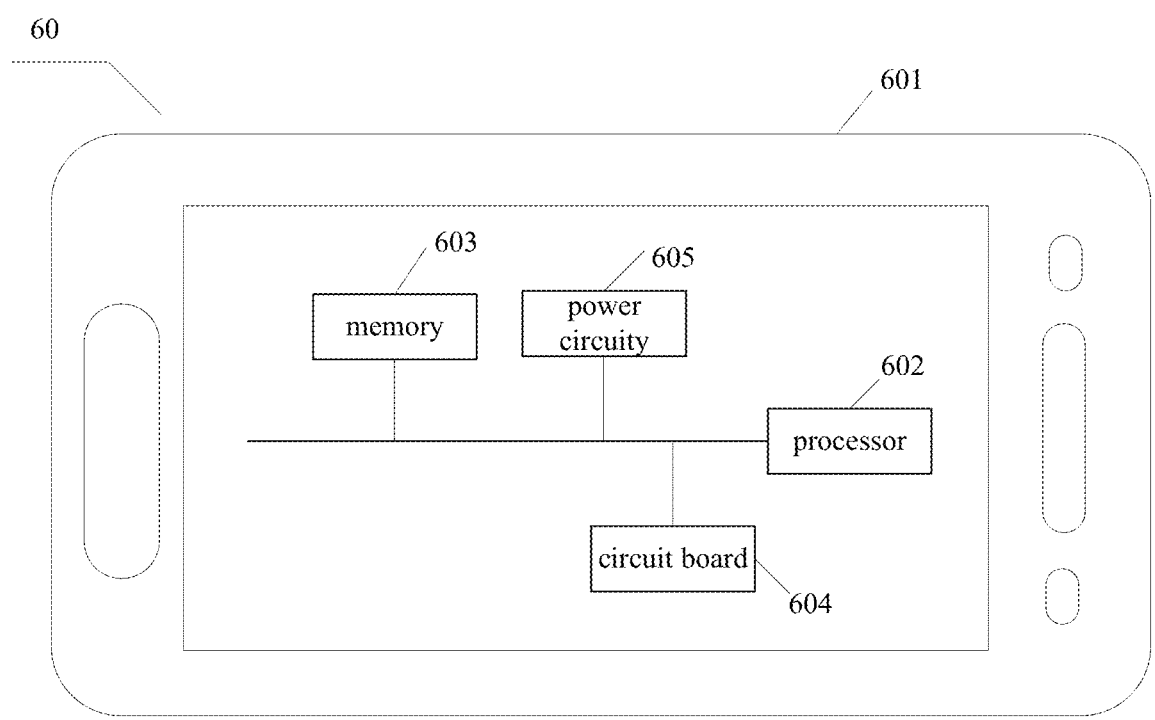
FIG. 6 is a block diagram illustrating a mobile terminal 60 according to an embodiment of the present disclosure.

FIG. 6 is a diagram schematic illustrating a mobile terminal 60 according to an embodiment of the present disclosure.

As illustrated in FIG. 6, the mobile terminal 60 includes a housing 601, a processor 602, a memory 603, a circuit board 604 and a power circuity 605. The circuit board 604 is arranged in a space enclosed by the housing 601. The processor 602 and the memory 603 are arranged on the circuit board 604. The power circuity 605 is configured to provide power to various circuities and components of the mobile terminal 600. The memory 603 is configured to store executable program codes. The processor 602 is configured to run programs corresponding to the executable computer codes by reading the executable program codes stored in the memory 603, to execute the followings.

In block S11', a first exposure time t required for current photographing is acquired and the first exposure time t is divided into N segments.

N is M power of 4, where M is a positive integer.

It should be explained that, N is a value set in advance according to pixel requirements. For example, the number of pixels of a camera included in a smart phone is 4 million. When it is required to provide an image having 16 million pixels, N is 4 and M is correspondingly 1.

It should be explained that, N may be set according to requirements of a specific application scenario. For example, N may be 16.

In block S12', the image sensor is controlled to move clockwise or counterclockwise according to a step length of a preset number of pixels by the MEMS, and the image sensor is controlled to expose for a second exposure time t/N after each movement of the image sensor according to a preset number of pixels, to acquire N images.

It should be understood that, the MEMS is moveable. For example, the MEMS is connected to a driving circuity and moves under driven of a driving voltage outputted by the driving circuity.

The preset number of pixels is set in advance. For example, the preset number of pixels may include one pixel. That is to say, the MEMS controls the image sensor to move clockwise or counterclockwise by taking the one pixel as the step length.

It should be explained that, the number of movements of the image sensor controlled by the MEMS is related to N.

The movement of the image sensor controlled by the MEMS is described in combination with FIG. 2. Assuming that N is 4, i.e., the first exposure time t is divided into 4, and the second exposure time is correspondingly t/4. When the image sensor is located at an initial position 1, the MEMS controls the images sensor to expose for the second exposure time t/4 for once, to acquire a first image. The MEMS controls the image sensor to move one pixel rightwards, such that the image sensor is located at a position 2. The image sensor is exposed again for the second exposure time t/4 for once, to acquire a second image. Afterwards, the MEMS controls the image sensor to move one pixel from the position 2 downwards, such that the image sensor is located at a position 3. The image sensor is exposed again for the second exposure time t/4 for once, to acquire a third image. The MEMS controls the image sensor to move one pixel from the position 3 leftwards, such that the image sensor is located at a position 4. The image sensor is exposed again for the second exposure time t/4 for once, to acquire a fourth image. In addition, it should be understood that, when the MEMS controls the image sensor to move one pixel from the position 4 upwards, the image sensor is located at the initial position 1 again.

In block S13', the N images are composited to obtain a composite picture.

After the N images are acquired, the plurality of images are composited using a principle of multi-image composition, to provide the composite picture having a high quality to the user, thereby satisfying a quality requirement to the image of the user.

With the mobile terminal according to embodiments of the present disclosure, when it is required to composite a plurality of captured images, the first exposure time t required for current photographing is acquired, and the first exposure time t is divided into N segments. The MEMS controls the image sensor to move clockwise or counterclockwise according to the step length of the preset number of pixels, and controls the image sensor to expose for the second exposure time t/N after each movement of the image sensor according to the preset number of pixels, to acquire N images. The N images are composited to obtain the composite picture. Therefore, by controlling the movement of the image sensor via the MEMS, the shakiness during the photographing is reduced, thereby further improving the quality of each image captured and improving an imaging quality of the composite picture.

In the description of the present disclosure, reference throughout this specification to "an embodiment", "some embodiments", "an example", "a specific example" or "some examples" means that a particular feature, structure, material, or characteristic described in connection with the implementation or example is included in at least one implementation or example of the present disclosure. In the specification, schematic expressions of the above terms are not necessarily referring to the same embodiment or example of the present disclosure. Furthermore, the particular features, structures, materials, or characteristics may be combined in any suitable manner in one or more implementations or examples. In addition, without contradiction, the different embodiments or examples and the features of the different embodiments or examples described in the specification can be combined by those skilled in the art.

In addition, terms "first" and "second" are only used for purposes of description and are not intended to indicate or imply relative importance or the number of technical features. In addition, the feature defined with "first" and "second" may explicitly or implicitly comprises at least one this feature. In the description of the present disclosure, the term "a plurality of" means at least two, such as two, three or the like, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution may be different from that which is depicted or discussed, including executing functions in a substantially simultaneous manner or in an opposite order according to the related functions, which should be understood by those skilled in the art of the embodiments of the present disclosure.

The logic and/or steps described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to (a non-exhaustive list): an electronic connection (IPM overcurrent protection circuit) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the implementations of the present disclosure may be realized by the hardware, software, firmware or their combination. In the above implementations, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments are exemplary and cannot be construed to limit the present disclosure, and changes, modifications, alternatives and variations can be made in the embodiments within the scope of the present disclosure.

What is claimed is:

1. A method for compositing a plurality of images, comprising:
    acquiring a first exposure time t required for current photographing, and dividing the first exposure time t into N segments, where N is M power of 4 and M is a positive integer;
    controlling by a micro-electro-mechanical system MEMS, an image sensor to move clockwise or counterclockwise according to a step length of a preset number of pixels, and controlling the image sensor to expose for a second exposure time t/N after each movement of the image sensor according to the preset number of pixels, to acquire N images; and
    compositing the N images to obtain a composite picture, wherein compositing the N images to obtain the composite picture comprises:
    determining an alignment rule of the N images according to a movement rule that the MEMS controls the image sensor to move, and aligning the N images according to the alignment rule; and
    for each pixel position in the N images aligned, comparing contents of current pixels in the N images, and performing pixel composition based on a comparison result.

2. The method according to claim 1, wherein comparing the contents of the current pixels in the N images and performing the pixel composition based on the comparison result comprises:
    determining whether each of matching degrees between the contents of N current pixels exceeds a preset threshold; and
    superimposing the N current pixels when each of the matching degrees exceeds the preset threshold.

3. The method according to claim 2, further comprising:
    in response to determining that any of the matching degrees between the contents of the N current pixels does not exceed the preset threshold, determining a first current pixel having a maximum difference from other current pixels in the N current pixels, replacing the first current pixel with one of the other current pixels, and superimposing the other current pixels and a replaced first current pixel.

4. The method according to claim 1, wherein the preset number of pixels comprises one pixel.

5. The method according to claim 1, wherein N is set in advance according to a pixel requirement required for current photographing.

6. The method according to claim 1, wherein compositing the N images to obtain the composite picture comprises:
    compositing the N images using a principle of multi-image composition, to obtain the composite picture.

7. A device for compositing a plurality of images, comprising:
    a processor, and
    a memory, having instructions executable by the processor stored thereon,
    wherein the processor is configured to:
    acquire a first exposure time t required for current photographing, and divide the first exposure time t into N segments, where N is M power of 4 and M is a positive integer;
    control via a micro-electro-mechanical system MEMS, an image sensor to move clockwise or counterclockwise according to a step length of a preset number of pixels, and control the image sensor to expose for a second exposure time t/N after each movement of the image sensor according to the preset number of pixels, to acquire N images; and composite the N images to obtain a composite picture;

wherein the processor is configured to:

determine an alignment rule of the N images according to a movement rule that the MEMS controls the image sensor to move, and align the N images according to the alignment rule; and for each position in the N images aligned, compare contents of current pixels in the N images, and perform pixel composition based on a comparison result.

8. The device according to claim 7, wherein the processor is configured to:

determine whether each of matching degrees between the contents of N current pixels exceeds a preset threshold; and superimpose the N current pixels when each of the matching degrees exceeds the preset threshold.

9. The device according to claim 8, wherein the processor is configured to:

in response to determining that any of the matching degrees between the contents of the N current pixels does not exceed the preset threshold, determine a first current pixel having a maximum difference from other current pixels in the N current pixels, replace the first current pixel with one of the other current pixels, and superimpose the other current pixels and a replaced first current pixel.

10. The device according to claim 7, wherein the preset number of pixels comprises one pixel.

11. The device according to claim 7, wherein N is set in advance according to a pixel requirement required for current photographing.

12. The device according to claim 7, wherein the processor is configured to:

composite the N images using a principle of multi-image composition, to obtain the composite picture.

13. A mobile terminal, comprising a housing, a processor, a memory, a circuit board and a power circuity, wherein the circuit board is arranged in a space enclosed by the housing; the processor and the memory are arranged on the circuit board; the power circuity is configured to provide power to various circuities and components of the mobile terminal; the memory is configured to store executable program codes; the processor is configured to run programs corresponding to the executable computer codes by reading the executable program codes stored in the memory, to:

acquire a first exposure time t required for current photographing, and divide the first exposure time t into N segments, where N is M power of 4 and M is a positive integer;

control by a micro-electro-mechanical system MEMS, an image sensor to move clockwise or counterclockwise according to a step length of a preset number of pixels, and control the image sensor to expose for a second exposure time t/N after each movement of the image sensor according to the preset number of pixels, to acquire N images; and composite the N images to obtain a composite picture, wherein the processor is configured to composite the N images to obtain the composite picture by:

determining an alignment rule of the N images according to a movement rule that the MEMS controls the image sensor to move, and aligning the N images according to the alignment rule; and for each pixel position in the N images aligned, comparing contents of current pixels in the N images, and performing pixel composition based on a comparison result.

14. The mobile terminal according to claim 13, wherein the processor is configured to compare the contents of the current pixels in the N images and perform the pixel composition based on the comparison result by acts of:

determining whether each of matching degrees between the contents of N current pixels exceeds a preset threshold; and superimposing the N current pixels when each of the matching degrees exceeds the preset threshold.

15. The mobile terminal according to claim 14, wherein the processor is further configured to:

in response to determining that any of the matching degrees between the contents of the N current pixels does not exceed the preset threshold, determine a first current pixel having a maximum difference from other current pixels in the N current pixels, replace the first current pixel with one of the other current pixels, and superimpose the other current pixels and a replaced first current pixel.

16. The mobile terminal according to claim 13, wherein the preset number of pixels comprises one pixel.

17. The mobile terminal according to claim 13, wherein N is set in advance according to a pixel requirement required for current photographing.

* * * * *

UNITED STATES PATENT AND TRADEMARK OFFICE
CERTIFICATE OF CORRECTION

PATENT NO.       : 10,728,465 B2
APPLICATION NO.  : 16/311722
DATED            : July 28, 2020
INVENTOR(S)      : Wu Page 1 of 1

It is certified that error appears in the above-identified patent and that said Letters Patent is hereby corrected as shown below:

On the Title Page

Item (73), the Assignee should read:
--(73) Assignee: GUANGDONG OPPO MOBILE
              TELECOMMUNICATIONS CORP.,
              LTD., Dongguan, Guangdong (CN)--

Signed and Sealed this
Third Day of November, 2020

Andrei Iancu
*Director of the United States Patent and Trademark Office*